United States Patent
Guering et al.

(10) Patent No.: US 9,446,850 B2
(45) Date of Patent: Sep. 20, 2016

(54) HEAT EXCHANGER INCORPORATED INTO A WALL OF AN AIRCRAFT

(71) Applicant: Airbus Operations SAS, Toulouse (FR)

(72) Inventors: Bernard Guering, Montrabe (FR); Yves Durand, Aussonne (FR)

(73) Assignee: Airbus Operations SAS (FR)

( * ) Notice: Subject to any disclaimer, the term of this patent is extended or adjusted under 35 U.S.C. 154(b) by 324 days.

(21) Appl. No.: 13/970,867

(22) Filed: Aug. 20, 2013

(65) Prior Publication Data

US 2013/0333857 A1 Dec. 19, 2013

Related U.S. Application Data

(63) Continuation of application No. PCT/FR2012/050340, filed on Feb. 17, 2012.

(30) Foreign Application Priority Data

Feb. 22, 2011 (FR) ...................................... 11 51429

(51) Int. Cl.
*B64C 1/00* (2006.01)
*B64D 13/08* (2006.01)
*B64D 13/00* (2006.01)
*B64D 13/06* (2006.01)

(52) U.S. Cl.
CPC ............... *B64D 13/08* (2013.01); *B64D 13/00* (2013.01); *B64D 2013/0614* (2013.01); *B64D 2013/0674* (2013.01); *F28F 2225/04* (2013.01); *Y02T 50/56* (2013.01)

(58) Field of Classification Search
CPC .............. B64D 2013/0614; B64D 2013/0607; B64C 1/06; B64C 1/061; B64C 1/064

USPC ........ 454/71, 76; 165/41, 44, 135, 136, 168, 165/169, 170

See application file for complete search history.

(56) References Cited

U.S. PATENT DOCUMENTS

| | | | | |
|---|---|---|---|---|
| 3,776,305 A | * | 12/1973 | Simmons | 165/104.25 |
| 4,819,720 A | | 4/1989 | Howard | |
| 5,107,920 A | * | 4/1992 | Scotti et al. | 165/109.1 |
| 5,112,010 A | | 5/1992 | Simison | |
| 5,599,217 A | * | 2/1997 | Ferrante | 440/88 R |
| 6,216,981 B1 | * | 4/2001 | Helm | 244/118.5 |
| 6,402,812 B1 | * | 6/2002 | Perrotta et al. | 95/95 |
| 6,796,527 B1 | * | 9/2004 | Munoz et al. | 244/118.5 |
| 6,845,630 B2 | * | 1/2005 | Bruno et al. | 62/323.3 |
| 7,337,769 B2 | * | 3/2008 | Yi | 123/563 |
| 2001/0047862 A1 | * | 12/2001 | Anderson et al. | 165/170 |

(Continued)

FOREIGN PATENT DOCUMENTS

| | | | |
|---|---|---|---|
| JP | 2002089934 A | * | 3/2002 |
| JP | 2004271166 A | * | 9/2004 |

(Continued)

*Primary Examiner* — Jerry Redman
(74) *Attorney, Agent, or Firm* — Lerner, David, Littenberg, Krumholz & Mentlik, LLP (57) ABSTRACT

An aircraft includes at least one wall delimiting a first zone (I) of the aircraft which is thermally insulated from the outside of the aircraft and a second zone (E) contained within the aircraft which is not thermally insulated with respect to the outside of the aircraft and a heat exchanger inside which a heat transfer fluid circulates, wherein the wall includes at least one duct inside which the heat transfer fluid circulates so as to act as a heat exchanger.

11 Claims, 5 Drawing Sheets

(56) References Cited

U.S. PATENT DOCUMENTS

| | | | |
|---|---|---|---|
| 2003/0056943 A1* | 3/2003 | Dessiatoun et al. | 165/142 |
| 2004/0149427 A1* | 8/2004 | Leathers | 165/203 |
| 2004/0194941 A1* | 10/2004 | Larrieu et al. | 165/170 |
| 2005/0045317 A1* | 3/2005 | Huebner et al. | 165/170 |
| 2006/0157234 A1* | 7/2006 | Golecki | 165/170 |
| 2007/0264133 A1* | 11/2007 | Schwarz et al. | 417/110 |
| 2008/0156473 A1* | 7/2008 | Ottow et al. | 165/169 |
| 2008/0271465 A1* | 11/2008 | Mossberg et al. | 62/5 |
| 2009/0071177 A1* | 3/2009 | Unezaki | F25B 13/00 62/196.1 |
| 2009/0250191 A1* | 10/2009 | Klein | 165/44 |
| 2010/0132915 A1* | 6/2010 | Blanding | 165/41 |
| 2010/0212857 A1* | 8/2010 | Bulin et al. | 165/41 |
| 2010/0323601 A1* | 12/2010 | Cremers et al. | 454/76 |
| 2011/0111683 A1* | 5/2011 | Kelnhofer | 454/76 |
| 2011/0132570 A1* | 6/2011 | Wilmot | 165/41 |
| 2011/0132584 A1* | 6/2011 | Wilmot | 165/135 |
| 2011/0146957 A1 | 6/2011 | Buchholz et al. | |
| 2011/0186263 A1 | 8/2011 | Piesker | |
| 2012/0118528 A1* | 5/2012 | Al-Ali | 165/41 |
| 2013/0037234 A1* | 2/2013 | Mackin | 165/41 |
| 2013/0111938 A1* | 5/2013 | Mevenkamp et al. | 62/129 |
| 2014/0083647 A1* | 3/2014 | Army et al. | 165/41 |
| 2014/0094103 A1* | 4/2014 | Dreyhaupt et al. | 454/76 |
| 2014/0116654 A1* | 5/2014 | McGlaun et al. | 165/104.26 |
| 2014/0216088 A1* | 8/2014 | Weber | 62/239 |
| 2015/0027676 A1* | 1/2015 | Eilken et al. | 165/168 |
| 2015/0065023 A1* | 3/2015 | Bruno | 454/71 |
| 2015/0151842 A1* | 6/2015 | Weixler | |
| 2015/0316276 A1* | 11/2015 | Matsugi | F24F 1/0007 62/160 |

FOREIGN PATENT DOCUMENTS

| | | |
|---|---|---|
| WO | 2009/146843 A1 | 12/2009 |
| WO | 2010/012684 A1 | 2/2010 |

* cited by examiner

HEAT EXCHANGER INCORPORATED INTO A WALL OF AN AIRCRAFT

CROSS-REFERENCE TO RELATED APPLICATIONS

The present application is a continuation of International Application No. PCT/FR2012/050340, filed Feb. 17, 2012, which claims priority from French Patent Application No. 11 51429 filed Feb. 22, 2011, the disclosures of which applications are hereby incorporated herein by reference.

FIELD OF INVENTION

The present invention relates to a heat exchanger incorporated into a wall of an aircraft.

BACKGROUND OF THE INVENTION

It is known for the fuselage of an aircraft to comprise a structure, the principal function of which is to transmit forces, onto which structure is attached a shell which gives the aircraft its aerodynamic properties. Thus, in flight, air flows along the outside face of the fuselage.

The structure comprises an assembly of beams, frames, stringers, stiffeners or other components. These elements can be made of metal and/or of composite materials. In parallel, the shell takes the form of a juxtaposition of panels or complete sections of metal plates connected to the structure by riveting or by any appropriate means. As a variant, these panels may be made of composite materials.

Figure 1:
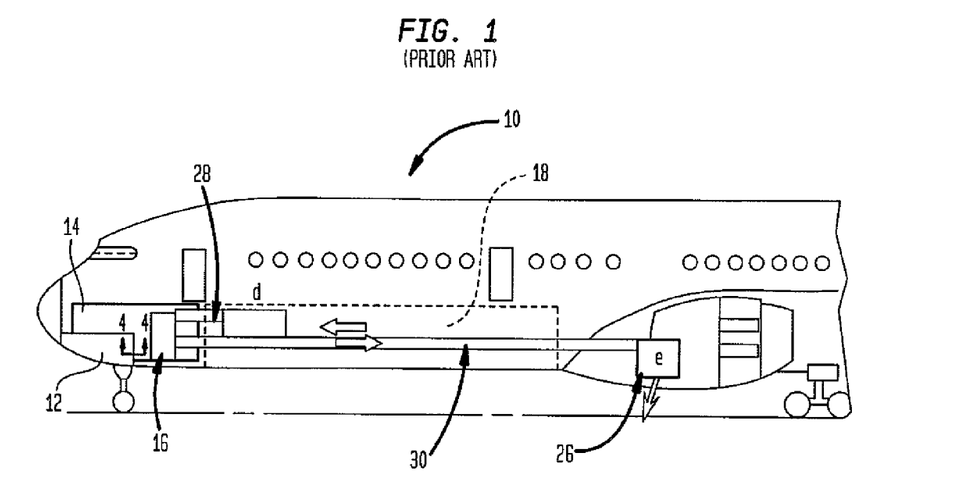
FIG. 1 is a side view of the front of an aircraft which shows, schematically, a cooling device in accordance with the prior art.
Figure 2:
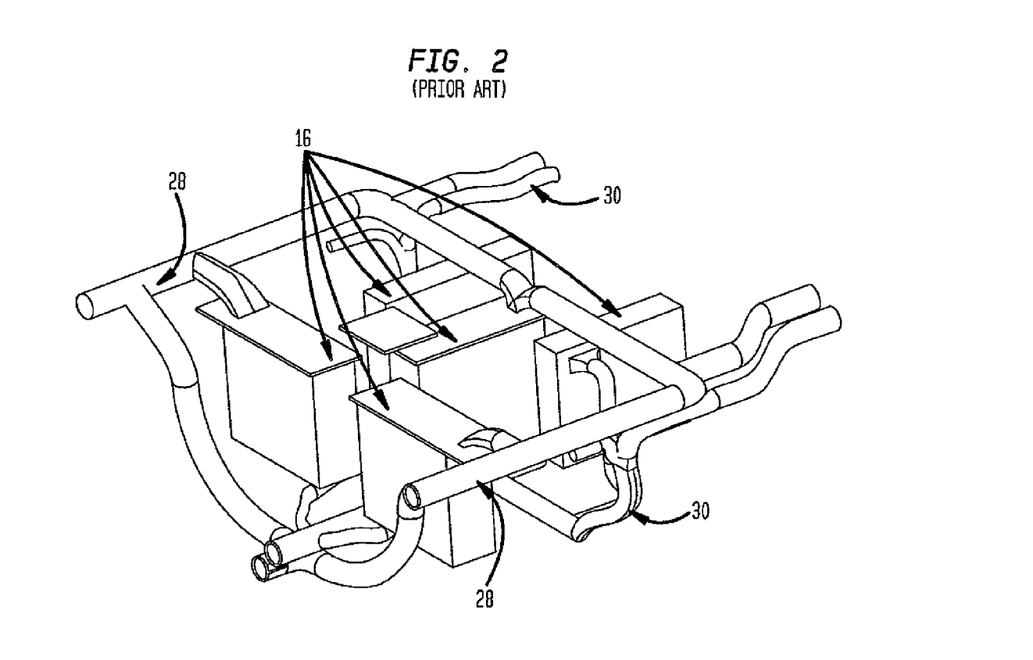
FIG. 2 is a view in perspective showing elements present in a forward technical bay in accordance with the prior art.

FIGS. 1 and 2 show an aircraft 10 and various zones such as a forward landing gear bay 12, inside which the forward landing gear 12 is designed to be housed when in flight, a forward technical bay 14, inside which electrical equipment and systems 16 are arranged, followed by what is known as a cargo hold 18. The forward landing gear bay 12 and the technical bay 14 are arranged in the nose section of the aircraft underneath the cockpit. In the case of an airplane intended for carrying passengers, the cargo hold 18 is arranged underneath the passenger cabin.

Certain zones of the aircraft are thermally insulated from the outside of the fuselage and are pressurized, such as the bay 14, the hold 18, the cockpit and the passenger cabin, while others, such as the forward landing gear bay 12, are not. The temperature of the air inside the landing gear bay can thus drop to −50° C. in flight, close to the temperature of the air outside the fuselage. The air inside said landing gear bay can be exposed to flows of speeds considerably lower than those of the air outside the fuselage.

Figure 4:
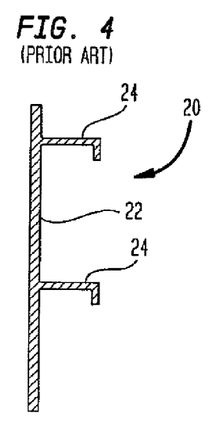
FIG. 4 is a section through a side wall of a landing gear bay in accordance with the prior art.

The forward landing gear bay 12 is part of the structure of the aircraft and comprises two side walls 20. One of these is shown in section in FIG. 4 with a base linking the upper edges of the side walls and a front wall and a rear wall linking, respectively, the front and rear edges of the side walls. The frames of the structure of the aircraft, arranged at the level of the forward landing gear bay, do not extend all the way around the fuselage and comprise a cut-out through which the landing gear can move. These frames are thus connected to the lower edges of the side walls 20 of the landing gear bay. In order to transmit forces, the faces of the walls of the forward landing gear bay 12 comprise a plurality of reinforcing elements. Thus, as shown in FIG. 4, the outer face 22 of the side walls 20 comprises stiffeners 24 oriented substantially perpendicular to the planes of the frames.

According to another aspect, the aircraft comprises numerous elements such as electrical equipment and systems 16, present in the forward technical bay 14, which produce heat and must be cooled.

As shown schematically in FIG. 1, in the case of the electrical equipment and systems 16, air taken from the cargo hold 18 is blown into the electrical equipment and systems 16. This air, which heats up as it passes through the latter, is drawn off so as to be conveyed to one or more heat exchanger(s) 26. According to one configuration, a network of ducts 28 for the fresh air is provided between the cargo hold 18 and the electrical equipment and systems 16, and a network of ducts 30 for the heated air is provided between the electrical equipment and systems 16 and the heat exchanger 26.

Figure 3:
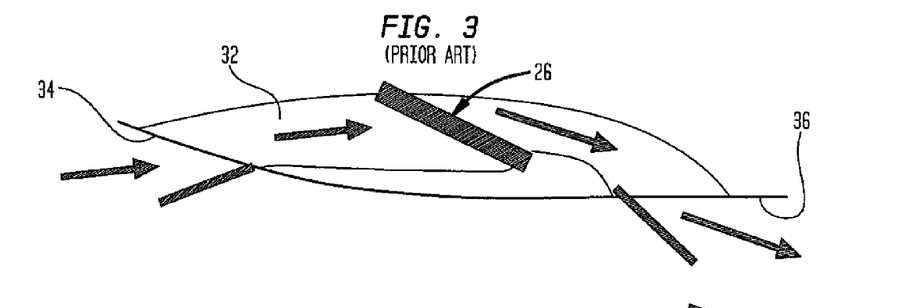
FIG. 3 is a schematic showing a heat dissipation device in accordance with the prior art.

As shown in FIG. 3, the heat exchangers 26 are arranged in a duct or ducts 32 through which flows air which is taken from outside the fuselage via at least one air intake 34 and which is rejected outside the fuselage via at least one air outlet 36.

Capturing the air via the intake 34 and rejecting it via the outlet 36 gives rise to aerodynamic perturbations which increase both the drag and the energy consumption of the aircraft. These perturbations must therefore be minimized.

However, aircraft cooling requirements are exhibiting a substantial upward trend. This increase in cooling requirements results in several drawbacks, specifically the increase in aerodynamic perturbations due to the increased volume of air taken and rejected, the increase in the on-board mass due to the increase in number and/or size both of the ducts 28, 30 and 32 and of the heat exchangers 26.

The shape and/or size of the intakes 34 and outlets 36 are optimized in order to limit the aerodynamic perturbations. For example, document FR-2.915.733 describes a movable outlet grating.

In order to limit these perturbations, other solutions have been developed for transferring the heat into the fuel tanks or into the engines by using the fuel as a heat transfer fluid. As an example, document FR-2.936.224 describes a system which makes possible for heat to be rejected via the engines. However, the heat absorption capacity of the fuel tanks or the engines is limited and is insufficient and inferior to the requirements of the aircraft.

In addition or as an alternative, other documents describe using the fuselage in order to dissipate heat. To this end, ducts are arranged close to the inner surface of the fuselage in order to transfer heat from the heat transfer fluid circulating in the ducts to the skin of the fuselage and then from the skin of the fuselage to the environment outside the aircraft. This solution is not entirely satisfactory as the efficiency of the heat transfer from the heat transfer fluid to the environment outside the aircraft depends on the efficiency of a first heat transfer from the heat transfer fluid to the skin of the fuselage and of a second heat transfer from the skin of the fuselage to the outside environment.

As the wall of the duct carrying the heat transfer fluid is not in direct contact with the outside environment, the transfer of heat is not optimal and depends, essentially, on the contact area between the walls of the ducts and the skin of the fuselage. Moreover, this heat transfer is also affected by the high-speed air flows outside the fuselage of the aircraft which can give rise to substantial heating due to the friction between the air and the fuselage.

BRIEF SUMMARY OF THE INVENTION

The present invention proposes an alternative or a complement to the prior art devices for transferring heat to the outside of the aircraft.

To this end, the invention relates to an aircraft comprising at least one wall delimiting a first zone of the aircraft which is thermally insulated from the outside of the aircraft and a second zone contained within the aircraft which is not thermally insulated with respect to the outside of the aircraft and a heat exchanger inside which a heat transfer fluid circulates, characterized in that said wall comprises at least one duct inside which the heat transfer fluid circulates so as to act as a heat exchanger.

BRIEF DESCRIPTION OF THE DRAWINGS

Other features and advantages will become clear from the following purely exemplary description of the invention, with reference to the appended drawings in which.

DETAILED DESCRIPTION

Figure 5:
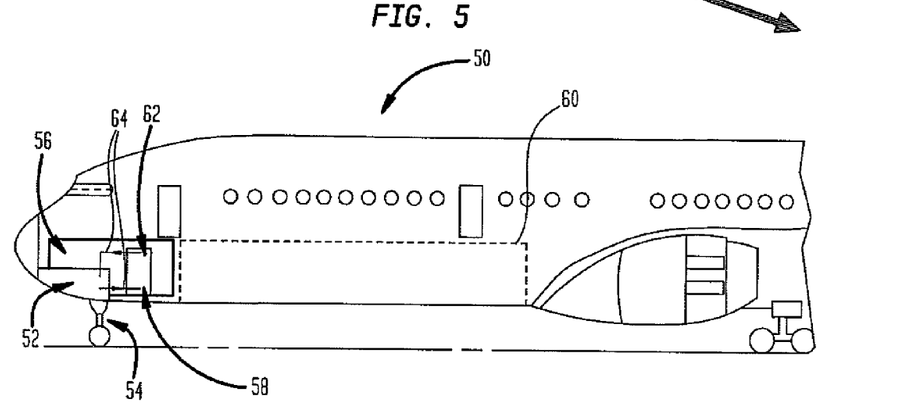
FIG. 5 is a side view of the front of an aircraft showing, schematically, a cooling device according to an embodiment of the invention.

FIG. 5 shows the front of an aircraft 50 comprising a landing gear bay 52 designed to contain a landing gear 54, a technical bay 56 in which are arranged units 58 containing electrical equipment and a cargo hold 60 which is separated from the technical bay 56 by a partition.

Certain zones of the aircraft are thermally insulated from the outside of the fuselage and are pressurized, such as the bay 56, the hold 60, the cockpit and the passenger cabin, while others, such as the forward landing gear bay 52, are not. The temperature of the air inside the landing gear bay can thus drop to −50° C. in flight, close to the temperature of the air outside the fuselage. Moreover, the air inside said landing gear bay is exposed to flows of speeds considerably lower than those of the air outside the fuselage and does not give rise to heating of the walls of the landing gear bay.

In the remainder of the description, the term "unit" is understood as meaning any type of container, such as a cupboard, a case or a housing, which is designed to accommodate equipment, in particular electrical equipment.

Figure 6:
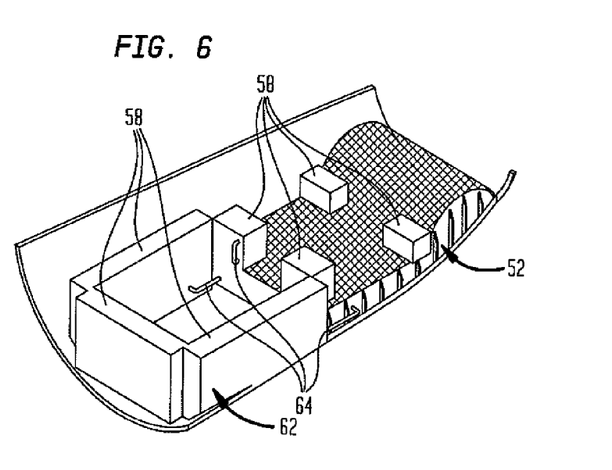
FIG. 6 is a view in perspective showing an optimized arrangement of elements present in a forward technical bay according to an embodiment of the invention.

The units 58 are preferably arranged in the technical bay in a ring so as to leave free a single central volume. This solution allows easy access to the front faces of the units 58 and improved separation between critical equipment (with the main equipment and the redundant equipment being diametrically opposite each other). This arrangement also makes it possible to provide compartments underneath the floor left free in the central part, in which electrical equipment can be arranged.

Finally, in accordance with another advantage, outside maintenance periods, the central space left free can be used for other ends, for example as a room fitted out for the crew.

In accordance with another aspect, electrical equipment constitutes a heat source 62 which must be cooled or kept within a range of temperatures.

In the remainder of the description, the term "heat source" 62 is understood to mean any device (for example a heat exchanger) or any fluid (for example the air in the passenger cabin) which must be cooled or kept within a given range of temperatures by means of a cooling device.

It is known for a cooling device to comprise at least one first heat exchanger which transfers heat from the heat source 62 to a heat transfer fluid and at least one second heat exchanger which transfers heat from the heat transfer fluid to the air outside the aircraft or to a zone of the aircraft which is not thermally insulated with respect to the outside and which is in general not pressurized.

In order to transfer the heat transfer fluid from the first heat exchanger to the second heat exchanger, the device comprises a network of ducts 64.

In accordance with one preferred embodiment, the heat transfer fluid is a liquid. This choice of heat transfer fluid makes it possible to reduce the bore section of the ducts 64, which tends to reduce the on-board mass.

The network of ducts 64 and the first heat exchanger are not described in more detail as they are known to those skilled in the art. The network of ducts is thus designed depending in particular on the location of the heat sources to be cooled. In parallel, the first heat exchanger is adapted to the heat source and to the heat transfer fluid. As an example, it can be serpentine in shape.

In accordance with one feature of the invention, the role of second heat exchanger is performed by at least one wall forming a partition between a zone I of the aircraft which is thermally insulated from the outside and a zone E which is contained within the aircraft and is not thermally insulated with respect to the outside of the aircraft. To this end, the wall comprises at least one duct within which the heat transfer fluid circulates.

This wall generally delimits a pressurized zone from a non-pressurized zone. It therefore possesses mechanical characteristics which allow it to withstand—possibly with a slight deformation—the pressure difference between the faces.

The second heat exchanger preferably comprises a duct within which the heat transfer fluid circulates and which is delimited by a wall, one face of which is in contact with the heat transfer fluid and the other face of which is in contact with the air present in the zone which is not thermally insulated.

This solution makes it possible to optimize the transfer of heat in that only one wall separates the heat transfer fluid from the air present in the non-insulated zone. It is thus possible for the distance separating the heat transfer fluid from the air to be less than 20 mm, or even less than 3 mm.

In accordance with another advantage, this wall is not an aerodynamic surface, and this means that it is possible for the duct or ducts to project from the face of the wall which is in contact with the air present in the zone E which is not thermally insulated in order to increase the surface area for heat exchange between the heat transfer fluid and the air.

In accordance with another advantage, in contrast to the air outside the aircraft, the air inside the aircraft in a non-insulated zone is not exposed to high-speed flows and does not give rise to any heating of the flow surface.

Advantageously, each duct is delimited in part by at least one rib, provided in order to increase the mechanical strength of the wall. A single part such as a rib can thus fulfill two roles, specifically one of structural strength and one thermal.

Figure 7:
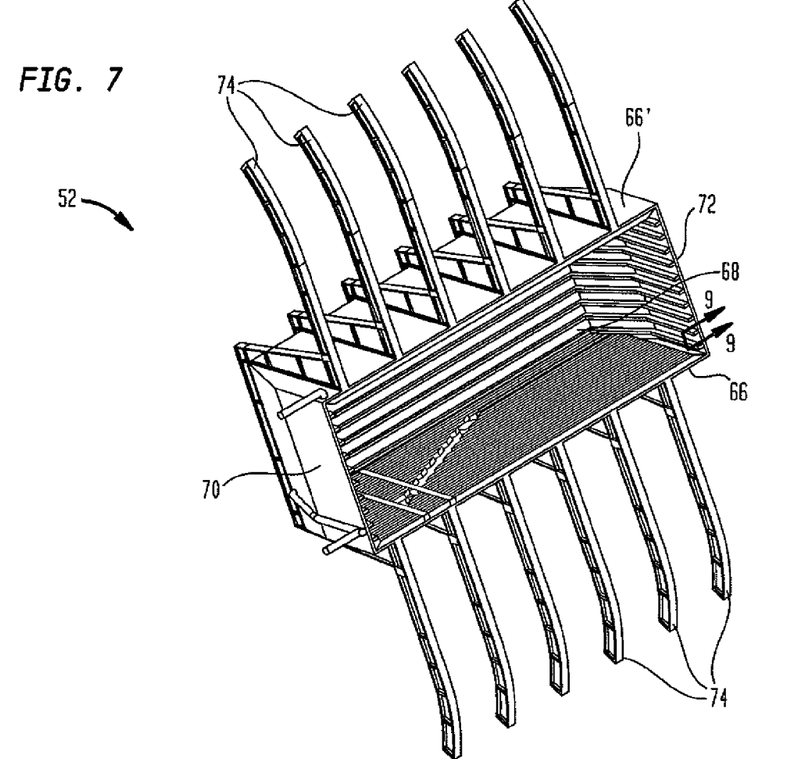
FIG. 7 is a view in perspective of a landing gear bay from a first viewpoint outside the aircraft.
Figure 8:
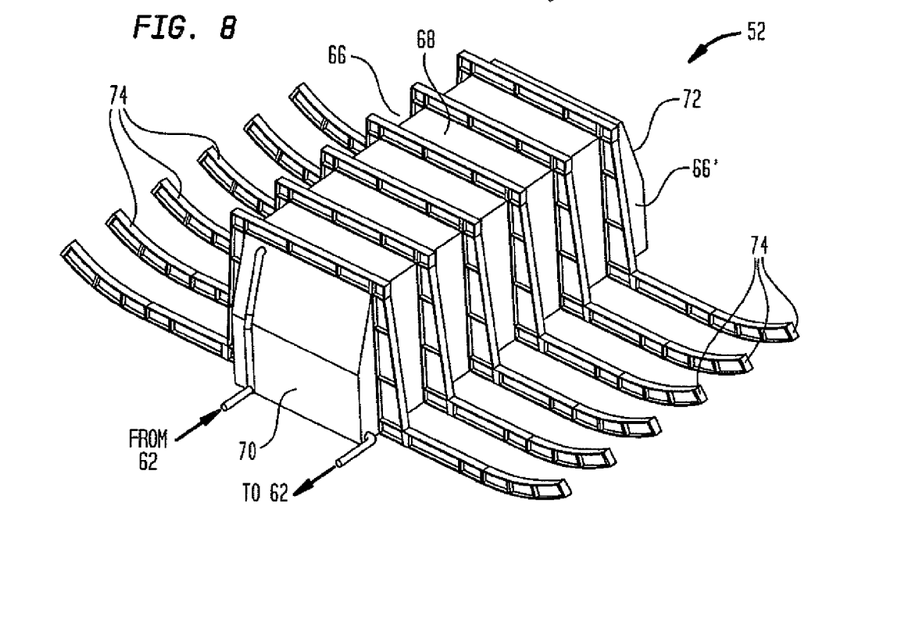
FIG. 8 is a view in perspective of a landing gear bay from another viewpoint inside the aircraft.
Figure 9:
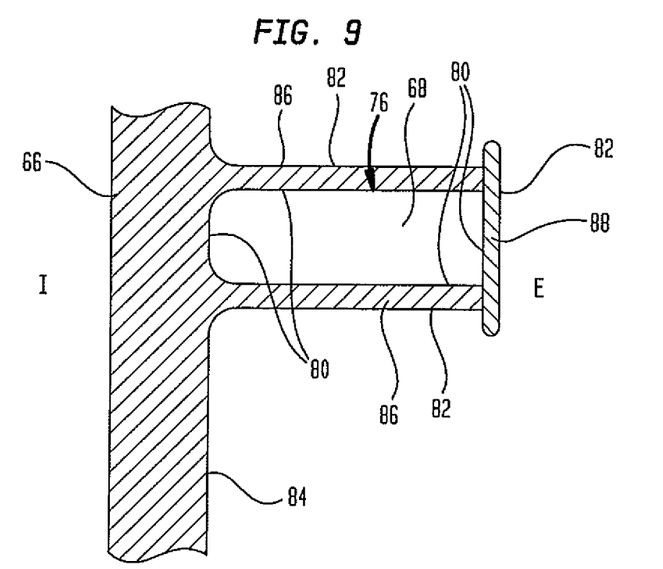
FIG. 9 is a section through a wall of a landing gear bay according to an embodiment of the invention.

In accordance with one embodiment, shown in FIGS. 7 to 9, the forward landing gear bay 52 comprises two side walls 66, 66', one of which is shown in section in FIG. 9, wherein the upper edges of the side walls 66, 66' are connected by a wall forming a base 68 and wherein the front and rear edges are connected, respectively, by a front wall 70 and a rear wall 72. The lower edges of the side walls 66, 66' of the landing gear bay are connected to frames 74 (only part of which is shown) which form part of the structure of the aircraft.

Advantageously, at least one wall of the landing gear bay 52 fulfills the role of second heat exchanger and comprises at least one duct 76, inside which a heat transfer fluid 78 circulates, comprising a face 80 in contact with the heat transfer fluid 78 and another face 82 in contact with the air present in a non-insulated zone, specifically the housing delimited by the landing gear bay and within which the landing gear is arranged.

This solution also makes it possible to reduce fatigue stresses caused by expansion effects, as the temperature differences between the ground and flight phases are less pronounced. It also makes it possible to obtain automatic de-icing of certain elements integrated into the landing gear bay, such as the articulation bearings.

At least one of the side walls 66, 66' is preferably used as a heat exchanger.

For the remainder of the description, only one of the side walls 66 is described. This embodiment can of course be replicated for the other side wall 66' and/or the other walls of the landing gear bay.

In accordance with one embodiment, the wall 66 comprises ribs 86 on its outer face 84. The ribs 86 are arranged in pairs, wherein a small distance—of the order of several centimeters—separates the ribs 86 of a same pair, this distance being markedly smaller than the distance between two ribs belonging to different pairs, wherein the ribs 86 of a same pair form the walls of a duct provided for the heat transfer fluid. Thus, in contrast to the ribs of the prior art which were present only as strengthening elements, the ribs 86 are intended to strengthen and to delimit a duct.

In order to close the duct, the side wall 66 comprises, for each pair of ribs 86, a cap 88 linking the ends of the two ribs 86 so as to delimit a duct 76 with said ribs 86 and the side wall.

In accordance with one embodiment, the side wall is created as a single piece and is produced by machining, preferably at high speed, given the thinness of the ribs 86. The caps 88 can be securely attached to the ribs by friction welding.

In accordance with another advantage, the hollow structure formed by a pair of ribs and a cap offers better mechanical strength than an isolated rib, and this means that it is possible to reduce the height of the ribs or the number thereof.

Figure 10:
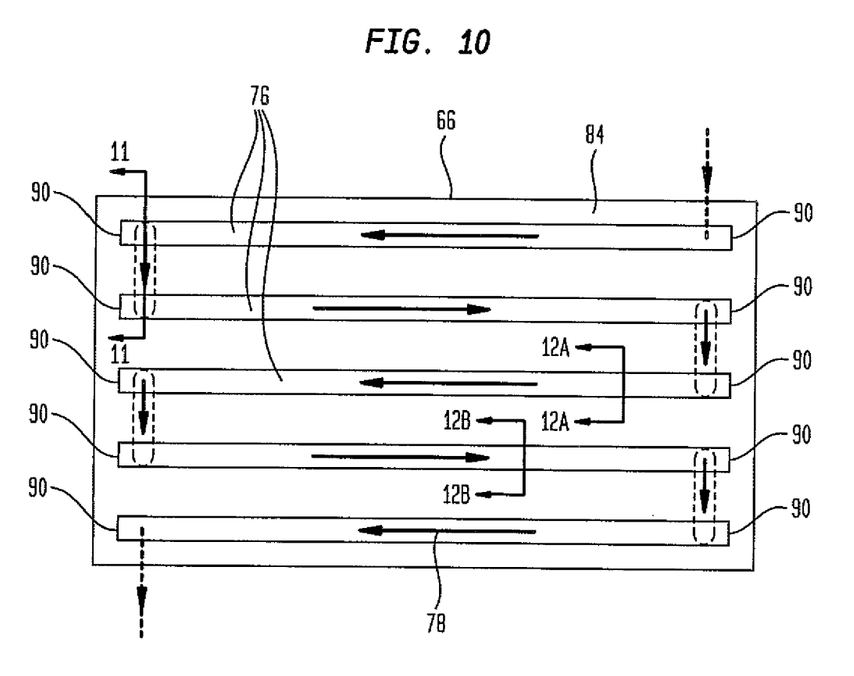
FIG. 10 is a side view of a wall of a landing gear bay according to an embodiment of the invention showing a circuit provided for a heat transfer fluid.

As shown in FIG. 10, the side wall 66 comprises several ducts 76 which are parallel to each other and to the lower edge of said wall.

The ends of each duct 76 are blocked off by transverse partitions 90 linking the two ribs which delimit the duct 76.

The ducts 76 are connected by U-shaped connectors 92. The ducts 76 are connected in a serpentine shape as shown in FIG. 10.

These U-shaped connectors 92 are provided on the inner face of the side wall 66.

In accordance with one embodiment, a U-shaped connector takes the shape of a thin-walled bent tube.

Figure 11:
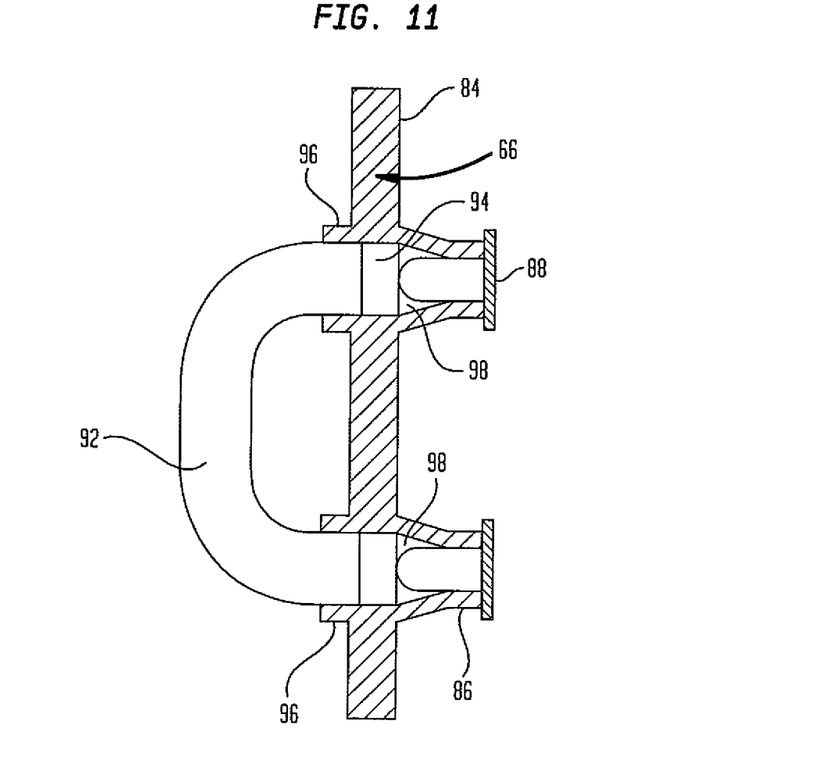
FIG. 11 is a view in section showing a detail of the circuit of FIG. 10.

As shown in FIG. 11, the side wall 66 comprises, for each end of the U-shaped connectors, a through hole 94 having, at one end, a sleeve 96 into which the end of the U-shaped connector can slot. At the other end, the ribs 86 are curved so as to delimit a beveled conical shape 98 (wherein the diameter at the wall 66 is greater than the diameter at the ends of the ribs) in line with each through hole 94 in order to limit localized pressure losses. Seals can be provided in order to ensure tightness between the U-shaped connectors and the side wall.

The invention is not restricted to this connector shape. Thus, it is possible for the U-shaped connectors to be integrated into the side wall and to be obtained by machining in the same way as the ribs 86.

One same side wall can comprise one or more zones, each zone comprising ducts 76 which are parallel to each other and are connected to each other by U-shaped connectors. The various zones can be connected by connection means in the form of ducts provided on the inner face of the side wall.

In accordance with another aspect, one same landing gear bay can comprise several walls having integrated ducts 76. Depending on the case, these ducts can be connected to each other so as to form a single circuit, or some can be separated from others so as to create several separate circuits.

The position of the ducts 76 will depend in particular on the individual features on the wall and on the mechanical stresses borne by said wall.

Figure 12A:
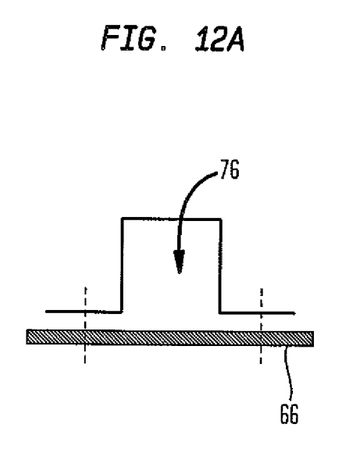
FIG. 12A is a view in section showing another variant of the circuit provided for a heat transfer fluid integrated into a wall of a landing gear bay.
Figure 12B:
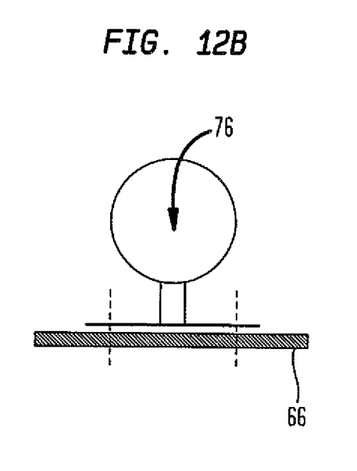
FIG. 12B is a view in section showing another variant of the circuit provided for a heat transfer fluid integrated into a wall of a landing gear bay.

In accordance with another point, the invention is not restricted to this embodiment of the ducts. As an example, other alternatives shown in FIGS. 12A and 12B can be envisaged in order to form ducts on the outer face of a wall. Thus, in FIG. 12A, a duct can be delimited by a stiffener having an omega-shaped cross section, which is added to the outer face of the wall and fastened thereto by any appropriate means. In FIG. 12B, the duct takes the shape of a tube connected at the end of a T-shaped profile section, the head of which is pressed firmly against the outer face of a wall and attached thereto by any appropriate means.

The invention claimed is:

1. An aircraft comprising:
   a first zone thermally insulated from outside of the aircraft;
   a second zone contained with the aircraft and not thermally insulated with respect to the outside of the aircraft;
   at least one wall delimiting the first zone of the aircraft and the second zone; and
   a first heat exchanger wherein a heat transfer fluid is configured to circulate to remove heat from a heat source in the aircraft,
   wherein said at least one wall comprises at least one duct wherein the heat transfer fluid is configured to circulates so as to act as a second heat exchanger to dissipate heat to air present in the second zone.

2. The aircraft as claimed in claim 1, wherein the at least one duct is delimited by at least one rib thereby increasing a mechanical strength of the wall.

3. The aircraft as claimed in claim 1, wherein the at least one duct is delimited by the at least one wall, a first face of the duct in contact with the heat transfer fluid and a second face of the duct is in contact with the air present in the second zone.

4. The aircraft as claimed in claim 1, wherein the duct projects from a face of the wall in contact with the second zone to increase a surface area for heat exchange between the heat transfer fluid and the air.

5. The aircraft as claimed in claim 1, wherein the at least one wall is a wall or a part of a wall delimiting a landing gear bay.

6. The aircraft as claimed in claim 5, wherein the wall delimiting the landing gear bay comprises, on an outer face thereof, a plurality of ribs arranged in pairs, with a cap for each pair linking the ends of the ribs so as to define a duct between each pair of the ribs and the wall.

7. The aircraft as claimed in claim 6, wherein the plurality of ribs is parallel to the lower edge of the wall.

8. The aircraft as claimed in claim 6, wherein a first end of a first duct and a second end of a second duct are blocked off by transverse partitions linking a first pair of ribs defining the first duct and a second pair of ribs defining the second duct, the first and second ducts being connected to each other by a connector so as to form a circuit.

9. The aircraft as claimed in claim 8, wherein the connectors is provided on the inner face of the wall.

10. The aircraft as claimed in claim 9, wherein the wall comprises, for each end of the connectors, a through hole, the ribs being curved so as to delimit a conical zone in line with each through hole to limit localized pressure losses.

11. The aircraft as claimed in claim 1, wherein the heat transfer fluid is a liquid.

* * * * *